Patented Feb. 3, 1931

1,791,455

UNITED STATES PATENT OFFICE

JOSIAH D. WALSTON, OF BRAINERD, MINNESOTA, ASSIGNOR TO BLACK DIAMOND PAINT COMPANY, OF MINNEAPOLIS, MINNESOTA, A CORPORATION OF MINNESOTA

COMPOSITION ROOF PAINT

No Drawing. Application filed September 8, 1927. Serial No. 218,362.

This invention relates to paint compositions and more particularly to a roof paint.

One of the objects of the present invention is to provide a roof paint which will be exceptionally durable and proof against cracking or softening and running under heat.

Another object of the invention is to provide a roof paint composition which will possess a desirable degree of elasticity and will be capable of filling in the more or less worn surface portions of metal roofs which have become corroded, thereby preventing further corrosion or rusting of the roofing material and preventing leaks.

Another object of the invention is to provide a roof paint which will be fire resisting and more durable than ordinary roof paint compositions.

The paint composition of the present invention comprises an intimate mixture of the following ingredients in substantially the proportions stated:

| | |
|---|---|
| Coal tar | 50 gal. |
| Pulverized rosin | 6 lbs. |
| Litharge | 8 lbs. |
| Zinc sulphate | 2 lbs. |
| Calcium sulphate | 2 lbs. |

In preparing the mixture the zinc and calcium sulphate and the litharge are thoroughly mixed and incorporated in the coal tar, together with pulverized rosin, and the incorporation of these ingredients in the coal tar is facilitated by the addition, to the mixture, of a suitable proportion of a mixture of gasoline and kerosene, in equal parts.

It will be understood, of course, that any suitable coloring matter may be incorporated in the paint mixture, and the mixture is applied to the surface to be protected, in the usual manner, the invention contemplating the application of the composition to old and worn metal roofs, as well as to new metal roofs, and composition roofs.

Having thus described my invention, what is claimed as new is:—

1. A roof paint in which are included an intimate mixture of coal tar, rosin, litharge, zinc sulphate and calcium sulphate, the coal tar being preponderant, the powdered and non-liquid ingredients being liquidized by the addition of gasoline and kerosene.

2. A paint composition in which are included an intimate mixture of coal tar, rosin, litharge, zinc sulphate, and calcium sulphate, in substantially the proportions of coal tar 50 gallons, pulverized rosin 6 pounds, litharge 8 pounds, zinc sulphate 2 pounds and calcium sulphate 2 pounds, the powdered and non-liquid ingredients being liquidized by the addition of gasoline and kerosene in equal parts.

In testimony whereof I affix my signature.

JOSIAH D. WALSTON.